April 19, 1966 J. W. OLANDT 3,246,529
CONTROL HEAD
Filed Sept. 18, 1963 2 Sheets-Sheet 1

INVENTOR.
JOHN W. OLANDT
BY Ernest Jensen
ATTORNEY

April 19, 1966  J. W. OLANDT  3,246,529
CONTROL HEAD
Filed Sept. 18, 1963  2 Sheets-Sheet 2

INVENTOR.
JOHN W. OLANDT
BY
ATTORNEY

United States Patent Office 3,246,529
Patented Apr. 19, 1966

3,246,529
CONTROL HEAD
John W. Olandt, North Arlington, N.J., assignor to Specialties Development Corporation, North Arlington, N.J., a corporation of New Jersey
Filed Sept. 18, 1963, Ser. No. 309,715
11 Claims. (Cl. 74—56)

The present invention relates to control heads for locally and/or remotely operating a valve or other mechanism, and, more particularly, to a control head which is an improvement over control heads such as shown in U.S. Patents No. 2,386,210, October 9, 1945, and No. 2,471,425, May 31, 1949.

One of the difficulties heretofore encountered with control heads, particularly those which are latched in a non-operated position, is that a considerable force is required to effect operation thereof. In order to minimize the force which a person is required to exert, arrangements are resorted to which provide a desired mechanical advantage. Such arrangements necessitate the use of a relatively large diameter pulley, a long lever or the like which increase the size and weight of the control head.

Accordingly, an object of the present invention is to provide an improved control head which is not subject to the prior objections and disadvantages.

Another object is to provide such a control head which will require a small manually applied operating force but yet is small in size and low in weight.

Another object is to provide such a control head which has an improved latching arrangement adapted to serve as a low friction bearing during the operation of the control head.

Another object is to provide such a control head which can be operated from at least two remote locations or can be operated locally and remotely with a minimum of effort.

A further object is to accomplish the foregoing in a simple, practical and eocnomical manner.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the acompanying drawings, forming a part of the specification, wherein.

Figure 1:
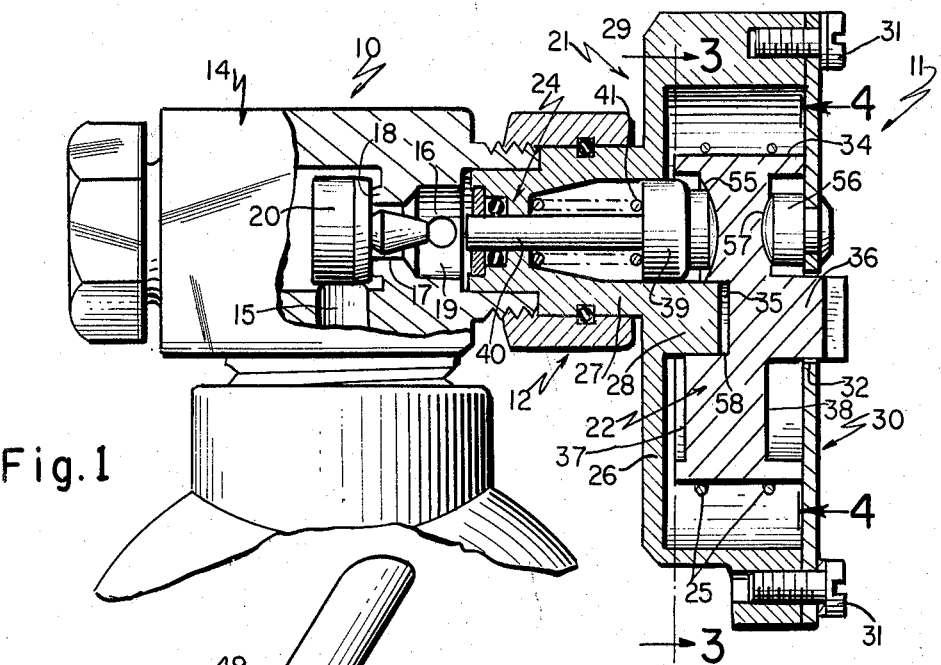
FIG. 1 is a longitudinal sectional view of valve and control head assembly illustrating a control head in accordance with the present invention for unseating a valve member.
Figure 3:
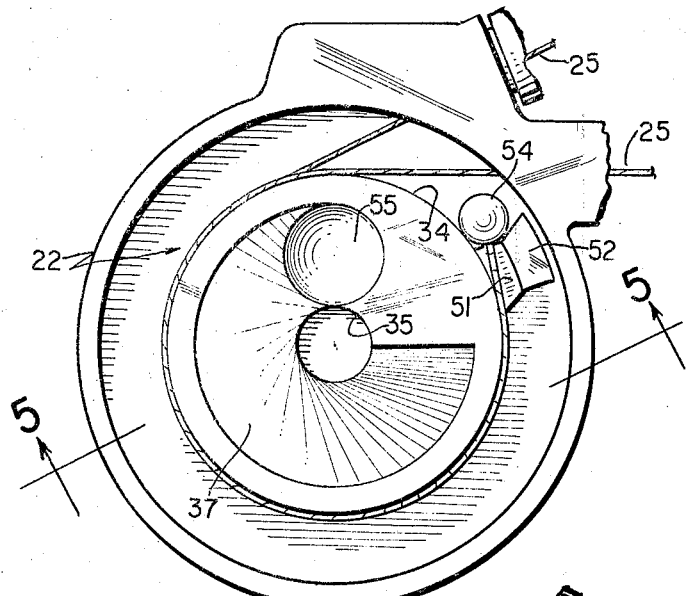
Figure 4:
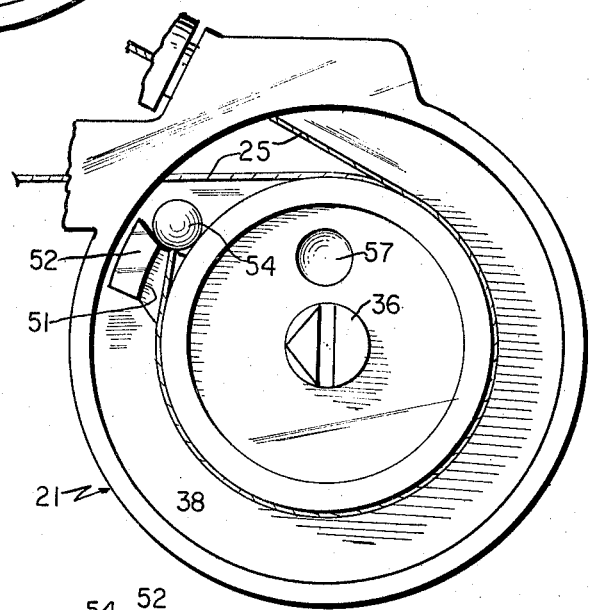

FIGS. 3 and 4 are sectional views, respectively, taken along the lines 3—3 and 4—4 on FIG. 1.

Figure 2:
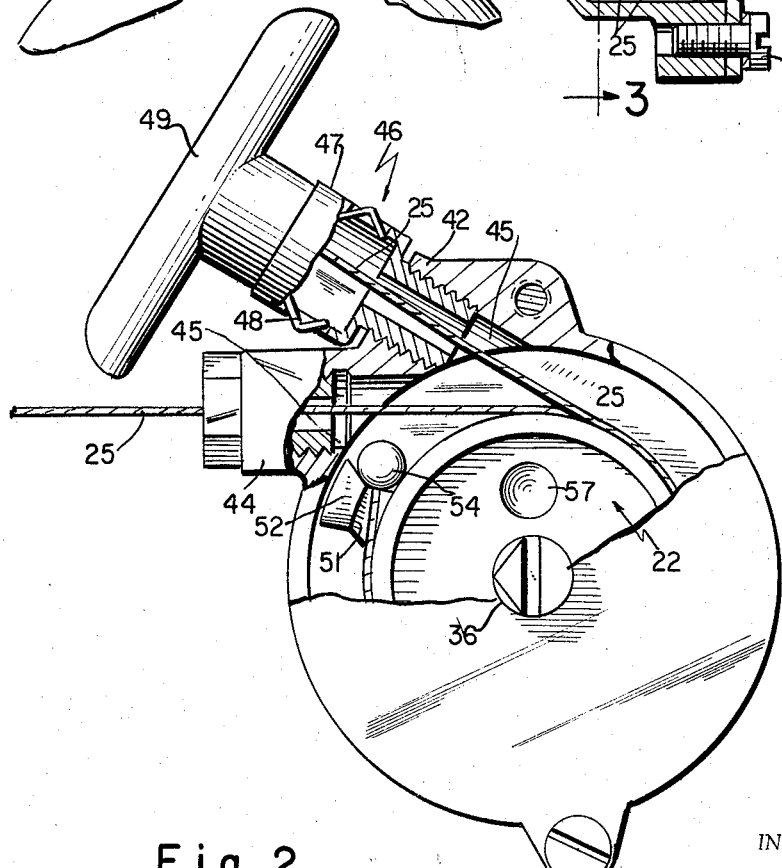
FIG. 2 is an end view of the control head as seen from the right in FIG. 1.
Figure 5:
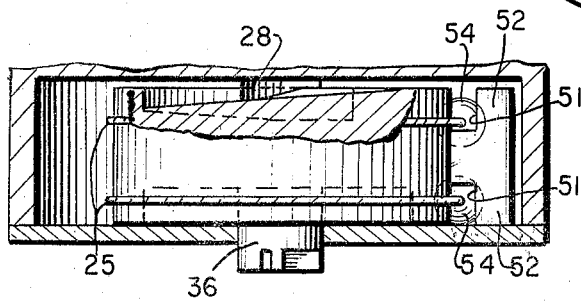

FIG. 5 is sectional view taken along the line 5—5 on FIG. 2.

Referring now to the drawings in detail, a valve and control head assembly is shown in FIG. 1 which includes a valve 10 and a control head 11 which are threadedly connected by a coupling 12.

The valve 10 is of a conventional type which comprises a body 14 having an inlet 15, connected to a receptacle containing gas under pressure, an outlet 16, a port 17 between the inlet and outlet surrounded by a valve seat 18 and an opening 19 facing the port 17; and a valve member 20 for the valve seat 18.

The control head 11 generally comprises a housing 21, a cam member 22 such as a pulley rotatably mounted in the housing, an element 24 actuated by the cam member, and means such as a pull cable 25 for effecting rotation of the cam member.

The control head housing 21 generally comprises an end wall 26 having an outwardly extending tubular portion 27 on which the coupling 12 is mounted and having an inner axle or boss 28 just below the tubular portion 27, a generally circular side wall 29 providing an open end facing the axle 28, and a cover 30 for the open end removably secured to the side wall 29 by screws 31 and having a bearing opening 32 in axial alignment with the axle.

The pulley 22 comprises a drum section 34 having a central bore 35 on one side for slidably and rotatably receiving the axle 28, a shaft 36 on the opposite side in axial alignment with the axle 28 and slidably and rotatably mounted in the bearing opening 32 of the cover 30, a circumferentially extending cam surface 37 (FIG. 3) on the side where the bore 35 is located, and an annular generally flat surface 38 (FIG. 4) on the opposite side and surrounding the shaft 36.

The actuating element 24 comprises a head or cam follower 39 slidably disposed in the tubular portion 27, and a stem 40 extending outwardly of the tubular portion for extending into the valve body opening 19 to engage the valve member so and effect unseating thereof upon operation of the control head. A spring 41 mounted in the tubular portion 27 urges the head 39 against the cam surface 37.

Rotation of the cam member or pulley 22 can be effected by connecting a lever (not shown) to the outer end of the shaft 36, but preferably, as already indicated herein, such rotation is effected by a cable 25. In order to enable such pull cable operation locally and remotely or from two remote locations, the side wall 29 of the housing 21 is formed with a pair of adjacent, circumferentially spaced, tangentially extending tubular sections 42 and 44 (FIG. 2), each having an opening 45, and a pair of cables 25 are wound side by side on the periphery of the pulley 22 and each extends outwardly through one of the openings to the point where it is to be pulled to effect rotation of the pulley.

Preferably, as shown herein, provision is made for operating one of the cables 25 remotely and the other locally. Such local operation is accomplished by securing a tubular fitting 46 in the opening of the tubular section 42, which fitting has a socket 47 for releasably mounting the shank 48 of a pull handle 49 to which the cable is secured.

As shown in FIG. 5, the pair of cables is releasably secured to the pulley by a T-shaped extension 50 in the peripheral surface of the pulley drum 34 which provides two cable slots 51 and two abutments 52 engaged by an element such as a ball 54 secured to each cable.

In order to lock the pulley 22 in a non-operated position as shown herein, the leading end of the cam surface 37 (FIG. 3) is formed with a recess 55 for receiving the head 39 of the actuating member 24.

As one of the features of the present invention, the force of the spring 41 acting on the pulley through the head 39 is prevented from tending to tilt the pulley with respect to its axis of rotation by providing a bearing member 56 on the inner side of the cover 30 which bears against the annular surface 38 and is in alignment with the head 39.

An improved locking arrangement is provided by forming the annular surface 38 with a recess 57 in alignment with the cam surface recess 55 for receiving the bearing member 56, whereby the spring 41 acting through the head 39 shifts the pulley slightly to the right as viewed (FIG. 1) to provide sufficient clearance 58 between the end of the axle 28 and the base of the bore 35 to enable the pulley to shift to the left as viewed as the recess 57 is moved away from the bearing member 56.

Another feature of the present invention is to provide such an effective locking arrangement which enables the pulley to be released with a minimum of effort, but yet can withstand vibrations. This is accomplished by causing the right side of the pulley to functionally engage the inner wall of the cover 30 under the influence of the spring 30. When pulley is actuated, the member 56 rides on the annular surface 38 and holds the pulley out of engagement with the cover. The head 39 and bearing member 56 are formed of a material such as tetrafluoroethylene which has a low coefficient of friction when sliding on a metallic surface. In this manner, the head 39 and bearing member 56 are readily disengaged from their respective recess and allow the cam surface 37 and the annular surface 38 to slide thereon with minimum resistance. A highly effective low force releasing arrangement is provided by employing shallow spherical recesses 55 and 57, respectively, for receiving the end of the head 39 and the bearing member 56 having a similar configuration. The improved locking and releasing arrangement enables the control head to be much smaller in size.

From the foregoing description, it will be seen that the present invention provides a simple, practical and reliable control head.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a control head, the combination of a housing, a rotatable member in said housing having a circumferentially extending cam surface on one side and having a generally flat annular surface formed with a recess on the opposite side, means for mounting said member for rotation about the center of said annular surface including means for permitting slight movement of said member along its axis of rotation, means for effecting rotation of said member, a latch member secured to said housing and extending into said recess to lock said rotatable member against rotation, an actuating element in said housing having an inner end in engagement with said cam surface and having an outer end extending outwardly of said housing, and a spring for urging the inner end of said element against said cam surface to move said rotatable member in an axial direction and urge said latch member into said recess and being adopted to yield and allow said latch member to move out of said recess and urge said rotatable member in the opposite axial direction upon rotation of said rotatable member, whereby said cam surface is effective to move said actuating element outwardly of said housing.

2. In a control head according to claim 1, wherein said latch member is formed of tetrafluoroethylene.

3. In a control head according to claim 1, wherein said cam surface includes a recess in alignment with said latch member recess for receiving the inner end of said actuating element.

4. In a control head according to claim 3, wherein the inner end of said actuating element is formed of tetrafluoroethylene.

5. In a control head according to claim 4, wherein said latch member is formed of tetrafluoroethylene.

6. In a control head, the combination of a housing having an open end and having an axle therein on its wall facing said open end, a cover for said open end having a bearing opening in axial alignment with said axle, a pulley having a bore for receiving said axle and a circumferentially extending cam surface on side thereof and having a shaft extending through said opening and an annular generally flat surface formed with a recess on the other side thereof, a latch member secured to said cover and extending into said recess, said pulley being axially slidable on said axle and said shaft, an actuating element in said housing having an inner end in engagement with said cam surface and in alignment with said latch member and having an outer end extending outwardly of said housing, a spring for urging the inner end of said element against said cam surface to urge said pulley against said latch member, and means for effecting rotation of said pulley whereby said spring yields to allow said pulley to move axially to enable said latch member to disengage said recess and said spring then urges said pulley axially to maintain said annular surface in engagement with said latch member.

7. In a control head according to claim 6, wherein said latch member and the inner end of said actuating element are formed of tetrafluoroethylene.

8. In a control head according to claim 7, wherein said cam surface has a recess for receiving the inner end of said actuating element and being in alignment with said latch member recess.

9. In a control head the combination of a generally circular housing having a pair of adjacent, circumferentially spaced, tangentially extending openings therein, a pulley rotatably mounted in said housing, a pair of cables wound side by side on said pulley in the same direction and each extending outwardly through one of said openings, and means for securing said cables to said pulley to effect rotation of said pulley in the same direction upon pulling either of said cables.

10. In a control head according to claim 9, wherein said cable securing means include a T-shaped extension on the periphery of said pulley and an element secured to each cable engaging said extension.

11. In a control head according to claim 9, wherein one of said openings has a tubular socket mounted therein through which one of said cables extends, a pull handle is secured to said cable extending through said socket, and said handle has a shank releasably mounted in said socket.

References Cited by the Examiner

UNITED STATES PATENTS

| | | | |
|---|---|---|---|
| 1,743,738 | 1/1930 | Travis | 251—253 X |
| 2,087,356 | 7/1937 | Parker | 251—256 X |
| 2,386,210 | 10/1945 | Grant | 74—56 |
| 2,630,018 | 3/1953 | Hannant | 74—107 |
| 2,865,225 | 12/1958 | Huffman | 74—107 X |
| 3,011,219 | 12/1961 | Williams | 18—59 |

BROUGHTON G. DURHAM, *Primary Examiner.*

F. E. BAKER, *Assistant Examiner.*